United States Patent [19]

Gonzalez

[11] Patent Number: 4,484,566
[45] Date of Patent: Nov. 27, 1984

[54] SOLAR COLLECTOR PANEL AND HEAT STORAGE SYSTEM

[76] Inventor: Emmanuel Gonzalez, 1307 Ellison St., Falls Church, Va. 22046

[21] Appl. No.: 355,369

[22] Filed: Mar. 8, 1982

[51] Int. Cl.³ .............................................. F24J 3/02
[52] U.S. Cl. .................................. 126/429; 126/435; 126/437; 126/445; 126/448; 126/360 A; 165/104.11; 165/111
[58] Field of Search ............... 126/428, 429, 430, 435, 126/437, 441, 444, 445, 448, 450, 400, 360 A, 360 R; 165/104.11 A, 111

[56] References Cited

U.S. PATENT DOCUMENTS

| | | | |
|---|---|---|---|
| 2,358,302 | 9/1944 | Brosius | 126/360 A |
| 2,680,437 | 6/1954 | Miller | 126/441 |
| 3,716,045 | 2/1973 | Vollhardt | 126/360 A |
| 4,030,478 | 6/1977 | Beaver, Jr. | 126/448 |
| 4,054,126 | 10/1977 | Ervin, Jr. | 126/435 |
| 4,258,697 | 3/1981 | Flagg | 126/430 |
| 4,297,990 | 11/1981 | Allisbaugh | 126/445 |

*Primary Examiner*—Margaret A. Focarino
*Attorney, Agent, or Firm*—Kenyon & Kenyon

[57] ABSTRACT

An air-based solar collector panel has a single glazing for a front wall. A first channel is defined by a sheet-like translucent member spaced apart rearwardly from the single glazing. A second channel is defined by a sheet-like absorber member spaced apart rearwardly from the translucent member. A third channel is defined by a wall member spaced apart rearwardly from the absorber member. Baffle members are disposed in the third channel to provide a circuitous gas flow path therein. Inflowing air enters and flows through the first channel and then enters and flows through the second channel where it first acquires significant heat from the absorber. The flowing air enters the circuitous path of the third channel where it is intensely heated by the absorber and very-hot-air exits the panel.

The heat contained in the very-hot-air may be stored by water contained in a tank. The very-hot-air is discharged through a bubbling means positioned at the bottom of the water tank. Baffle members are provided in the water tank to provide a circuitous path through the water for the air bubbles rising in the water. The circuitous path enhances heat transfer between the rising air bubbles and the tank water.

25 Claims, 8 Drawing Figures

SOLAR COLLECTOR PANEL AND HEAT STORAGE SYSTEM

FIELD OF INVENTION

This invention relates to solar heating systems. More particularly this invention relates to air-based solar collector panels with liquid thermal energy storage.

BACKGROUND OF THE INVENTION

Solar collector panels capture heat from the sun and transfer the heat directly to a space to be heated, such as the interior of a building, or to a heat storage device. In general, solar collector panels comprise an enclosed space, glazing oriented to the sun, a plate which absorbs solar radiation and converts it into heat, and intake and outflow passages for a circulating heat-transfer fluid. A panel is said to be air-based if the heat transfer fluid is air. The panel is said to be liquid-based if the heat-transfer fluid is liquid. The system as a whole is said to be active if it utilizes an extrinsic device for circulating the fluid, rather than relying on natural convection.

Air-based panels can be used by themselves to bring heated air directly into a living space, or in conjunction with a storage mechanism which retains heat energy for release at a later time. In a system intended to provide a significant portion of a building's heating needs on a continuous basis, some form of storage is required. Without storage, living-space air becomes uncomfortably hot during the day, requiring venting and thus energy wastage. Furthermore, little energy is retained for release at night or on cloudy days when the panels are not in operation.

Panels have varying levels of "efficiency". This term is used in a very general sense in the art to describe the percentage of solar energy, out of that theoretically possible, which is actually delivered to the interior of a building or a storage mechanism. When not in operation, panels lose no energy, being remote from the living space. However, they do lose a significant amount of energy while in operation. Glazing reflects some sunlight, particularly at acute angles of incidence ("reflection loss"); it also absorbs and re-radiates some radiation ("re-radiation loss"). Far more important, even as panels gain heat from the sun, they also lose heat through the glazing to the outdoor air ("heat loss"), reducing the amount of heat delivered to the interior of a building or a storage mechanism ("net heat yield"). The rate of heat loss is directly proportional to the difference between the panel's air temperature and the temperature of the outdoor air.

Through minimization of panel air temperature, a panel can be made more "efficient". A simple way to do this is to have a large fan and a differential thermostat setting which result in evacuation of panel air as soon as it becomes, for example, 1° F. hotter than living-space air. "Efficient" panels are correspondingly associated with low delivered-air temperature, since it is the very device of lowering the temperature which makes them efficient. However, this "efficiency" is to a great extent illusory, since low-temperature delivery is incompatible with storage mechanisms, whose storage capacity is dependent on the temperature to which they can be heated. When storage is desired, the system must be designed to deliver very hot air, which promotes panel heat loss and lowers panel "efficiency" but does get the delivered heat into storage. The various very-hot-air systems have their own drawbacks aside from lower net heat yield, such as, a shorter operating day, more expensive materials and assembly, and greater weight which complicates installation.

Thus, with existing panel designs, a user must choose between low-cost, high net heat yield panels without the possibility of storage, or higher-cost, lower heat yield panels which permit storage.

As previously discussed, solar systems intended to provide a large part of a building's heat on a continuous basis require some form of heat energy storage. Storage mechanisms can be classified according to the type of energy-retentive material used—liquids, rocks, and phase-change materials. Among the more important criteria for selection or design of a storage system are: installed cost, volume of occupied space in relation to heat-storage capacity, and compatibility with different types of collector panels.

Phase-change materials occupy the least space and can be used with both liquid- and air-based panels given the proper heat-transferring devices. However, they must be hermetically-sealed in pressure-resistant containers and are extremely expensive.

Rock or masonary storage in a bin is relatively inexpensive but occupies a very large amount of space and is generally impractical for installation in pre-existing structures while imposing serious architectural constraints on new ones. It's main advantage is compatibility with air-based panels, which (even if of the very-hot-air variety) are much more efficient and much cheaper to fabricate and install than liquid-based panels.

Liquid storage—typically a water tank—is also inexpensive and typically occupies about one-quarter the space of a rock-bin for a given storage capacity. Liquid storage devices are somewhat easier to install and fill than rock-bin devices. Because of these characteristics, liquid storage devices are comparatively easier to retrofit into existing structures and imposes few constraints on new-structue design. Water tanks would be nearly ideal storage if not for the fact that heat is difficult to transfer from air to water and thus they have up to now necessitated the use of liquid-based panels. However, liquid-based panels are themselves expensive, complicated, and heavy; need expensive plumbing and control devices; are prone to mechanical breakdown and freezing damage; and yield less heat than air-based panels.

Accordingly, there is a need in the art for a solar heating system wherein the user does not have to choose between low-cost, high net yield collector panels without the possibility of thermal energy storage or higher-cost, lower yield panels which permit storage. There is also a need in the art for a low-cost thermal energy storage mechanism which occupies a minimum of space while storing a maximum of heat, and which is capatable with low-cost, high net yield air-based solar collector panel.

OBJECT OF THE INVENTION

It is therefore an object of the present invention to provide an air-based solar collector panel having high real efficiency and which outputs very hot air suitable for storage.

It is another object of the present inventor to provide an air-based collector panel having a high useable heat yield outputted as very hot air.

It is a further object of the present invention to provide an air-based solar collector panel which minimizes heat loss to the outdoor air while simultaneously outputting very hot air.

It is still a further object of the present invention to provide an air-based solar collector panel which permits high useable light transmission at acute angles of incidence.

It is a further object of the present invention to provide an air-based solar collector panel which minimizes reflection and re-radiation losses.

It is still another object of the present invention to provide an air-based solar collector panel having a long operating day.

It is yet another object of the present invention to provide an air-based solar collector panel which can utilize a light weight absorber and outputs very hot air.

It is a further object of the present invention to provide such an air-based solar collector panel which is low in cost, light weight, simple to install, and easy to manufacture.

It is still another object of the present invention to provide an efficient, compact, low cost, thermal energy storage mechanism for use with air-based solar collector panels.

It is still a further object of the present invention to provide a liquid energy storage system for use with air-based solar collector panels.

These and other objects will be apparent from the following description and claims in conjunction with the drawings.

SUMMARY OF THE INVENTION

The present invention may be generally summarized as a very-hot-air based solar collector panel comprising a frame member having two spaced apart end walls and two spaced apart side walls;
- a glazing supported by said frame member and forming a front wall for exposure to solar radiation;
- a translucent member disposed in said frame member spaced rearwardly from said glazing wherein said translucent member is substantially coextensive with said glazing for providing a first gas flow channel therebetween having an inlet near one end wall and an outlet near the other end wall;
- a radiant heat absorber member disposed in said frame member spaced rearwardly from said translucent member wherein said heat absorber member is substantially coextensive with said translucent member for providing a second gas flow channel therebetween having an inlet near said other end wall and an outlet near said one end wall;
- a wall member disposed in said frame member rearwardly from said heat absorber member wherein said wall member is substantially coextensive with said heat absorber member for providing a third gas flow channel therebetween having an inlet near said one end wall and an outlet near said other end wall;
- a first gas flow passage between said first channel outlet and said second channel inlet for providing communication therebetween;
- a second gas flow passage between said second channel outlet and said third channel inlet for providing communication therebetween;
- means for providing gas flow communication from the exterior of said panel into said first channel inlet;
- means for providing gas flow communication from said third channel outlet to the exterior of said panel.

In a preferred embodiment of the present invention, the glazing is a single glazing and a plurality of spaced apart baffle members are disposed in said third channel for providing a circuitous gas flow path in said third channel for extending the contact between said heat absorber member and a gas flowing in said third channel.

In another preferred embodiment of the present invention, the hereinbefore described solar collector panel is used in conjunction with a heat storage system wherein said solar collector panel third channel outlet gas flow communication means is joined in gas flow communication to a first conduit means having an end terminating in a tank for holding a heat storage liquid, said tank comprising:
- a top end and a bottom end;
- gas bubbling means located near said bottom end of said tank joined in gas flow communication with said conduit means termination end;
- a plurality of baffle members disposed in said tank for providing a circuitous path of travel near said tank bottom to said tank top for gas bubbles discharged from said bubbling means into said liquid disposed in said tank for extending the contact between said gas bubbles and said liquid;
- a perforate slab of thermal insulation material disposed in said tank for positioning adjacent to the surface of said liquid disposed therein with said slab having a size sufficient to substantially cover said liquid surface; and
- gas discharge means located at the top end of said tank for discharging warm humidified air for heating a living space.

The preferred heat storage liquid is water. The heat storage system of the present invention may also be adapted for use with essentially any very-hot-air based solar collector panel.

BRIEF DESCRIPTION OF THE DRAWINGS

In the drawings, forming a part hereof.

DESCRIPTION OF THE PREFERRED EMBODIMENT

In order to afford a complete understanding of the present invention and an appreciation of its advantages, a description of the preferred embodiments is set forth below.

Figure 1:
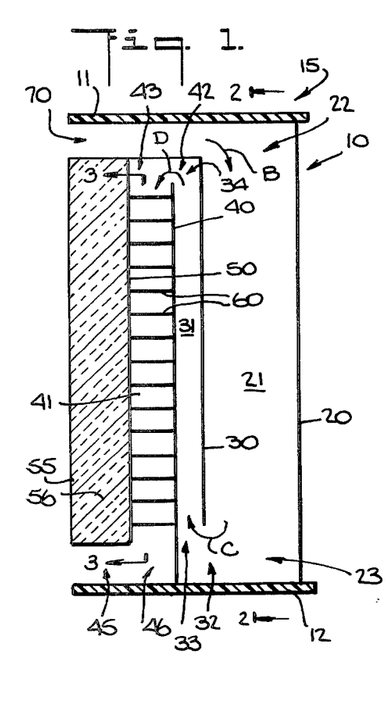
FIG. 1 is a schematic side elevation cross-sectional view of a solar collector panel in accordance with the present invention.
Figure 2:
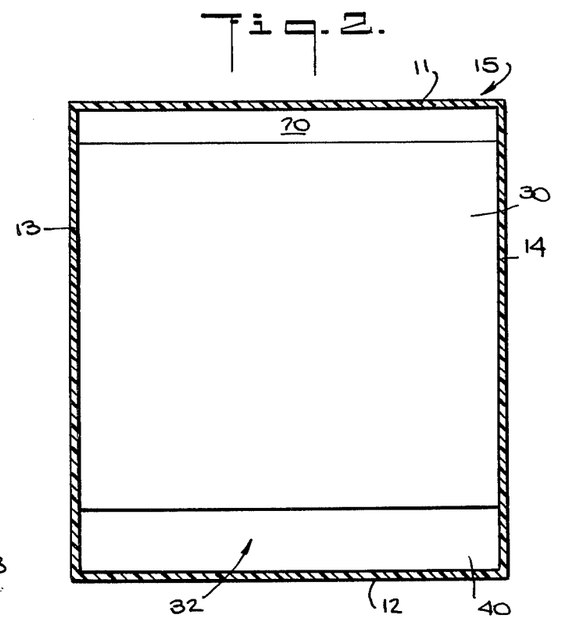
FIG. 2 is a schematic cross-sectional view of the solar collector panel of FIG. 1 along line 2—2.

FIG. 1 shows an air-based solar collector panel 10 in accordance with the present invention comprising end walls 11 and 12 and side walls 13 and 14 (seen in FIG. 2) which form a panel frame 15. FIG. 1 illustrates the collector panel 10 in a vertical orientation with end wall 11 being at the top and end wall 12 being at the bottom. However, it will be readily understood by one skilled in the art that the collector panel may assume a variety of orientations depending on the structure to which it is installed and the optimum orientation permitted by that structure to take best advantage of the sun's solar radiation.

A single glazing 20 is gas tightly mounted to frame 15 so as to form a front wall of the solar collector panel 10. It will be understood that a retractable or detachable protective wall member may be used to protect the glazing when the collector panel is not in use. The glazing 20 may be mounted to the frame 15 in any convenient manner known to the art.

A translucent material sheet-like member 30 is disposed within the frame 15 extending from side wall 13 to side wall 14 and spaced apart rearwardly from the glazing 20 so as to form a first gas flow channel 21 therebetween. Translucent sheet 30 is substantially co-extensive with and preferably substantially parallel to glazing 20.

A sheet-like radiant heat absorber member 40 is disposed within the frame 15 extending from side wall 13 to side wall 14 and spaced apart rearwardly from the translucent member 30 so as to form a second gas flow channel 31 therebetween. Heat absorber member 40 is substantially coextensive with and preferably substantially parallel to translucent member 30.

A wall member 50 is disposed within the frame 15 extending from side wall 13 to side wall 14 and spaced apart rearwardly from the heat absorber member 40 so as to form a third gas flow channel 41 therebetween. Wall member 50 is substantially coextensive with and preferably substantially parallel to heat absorber member 40.

A rear wall member 55 is mounted on frame 15 and is spaced apart rearwardly from wall member 50. Rear wall member 55 is substantially coextensive with and preferably parallel to wall member 50. Thermal insulation material 56 is disposed in the space between rear wall member 55 and wall member 50.

Figure 3:
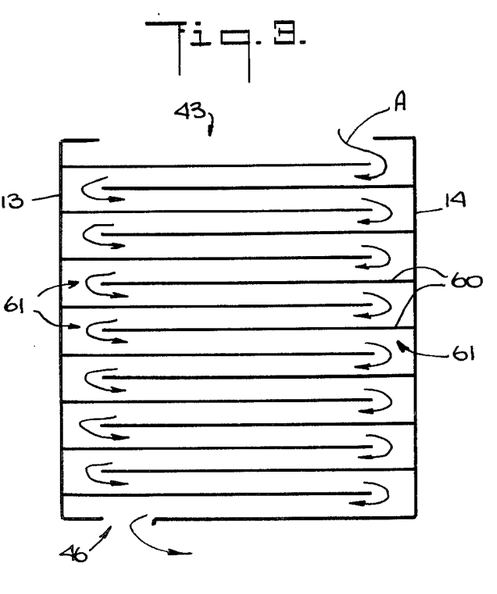
FIG. 3 is a schematic cross-sectional view of the solar collector panel of FIG. 1 along line 3—3.

A plurality of horizontally spaced apart baffle members 60 are disposed in third gas flow channel 41 extending from wall member 50 to heat absorber member 40 as illustrated in FIG. 1. Preferably, the baffle members 60 are substantially normal to heat absorber member 40 and wall member 50. As illustrated in FIG. 3, alternate baffle members extend from side wall 13 stopping short of side wall 14 and extend from side wall 14 stopping short of side wall 13. Accordingly, gas flow passages 61 are formed between the spaces defined by adjacent baffle members 60 with the passages 61 for adjacent baffle members 60 alternating from being near side wall 13 and side wall 14. It will be appreciated that baffle members 60 have provided a circuitous gas flow path or gas flow maze as indicated by arrow A (FIG. 3) in third gas flow channel 41 the reasons for which will hereinafter be discussed. It will become apparent that other arrangements of the baffle members 60 may be provided.

A gas inflow passage 70 in panel 10 is provided near end wall 11 for introducing air from the exterior which is discharged into inlet 22 of first gas flow channel 21 which is also located near end wall 11. A gas flow passage 32 is provided between first gas flow channel 21 outlet 23 and second gas flow channel 31 inlet 33 near end wall 12. Gas flow passage 32 may be conveniently provided by terminating translucent member 30 near but not touching end wall 12.

A gas flow passage 42 is provided between second gas flow channel 31 outlet 34 and third gas flow channel 41 inlet 43. Gas flow passage 42 may be said to be near end wall 11 and is conveniently provided by terminating heat absorber member 40.

A gas outflow passage 45 is provided at third gas flow channel 41 outlet 46 near end wall 12 for the outflow of gas from the panel 10 to the exterior.

The glazing 20 and the translucent member 30 are non-air-permeable material such as clear glass or clear plastic or any other material which will readily transmit solar radiation to the heat absorber member 40. A single glazing is preferred. However, double glazings or other glazing arrangements may be used in the solar panel of the present invention. For reasons to be hereinafter discussed in detail, the translucent member 30 is not comparable in function and operation to the second pane of glazing in a double-glazing assembly frequently used in the solar collector panel art.

The heat absorber member 40 is preferably a flat, thin sheet of material which has been blackened, e.g. by paint, on its side facing the glazing 20 to increase its heat radiation absorption capability. Thicknesses of the sheet-like heat absorber member may be, e.g., 20-24 gauge. The heat absorber member may be advantageously fabricated from high thermally conductive material such as aluminum or copper or steel. Other materials may be used.

In operation, the solar collector panel of the present invention functions as follows. Sunlight is transmitted through the single exterior glazing 20 and the translucent member 30 striking the absorber member 40. The thin absorber member 40 warms rapidly.

Air is drawn from a living space by a pump or blower fan (not shown) and inputed into air inflow passage 70 and enters first gas flow channel 21 (as illustrated by arrow B in FIG. 1) which may be referred to as an air intake channel. The air flows in first gas flow channel 21 and enters second gas flow channel 31 (as illustrated by arrow C in FIG. 1) which may be referred to as a flow through channel. The air flows in flow through channel 31 and begins to pick up heat from heat absorber member 40. The air exits flow through channel 31 and enters the third gas flow channel 41 (as illustrated by arrow D in FIG. 1) and flows through the circuitous gas flow path (illustrated by arrow A of FIG. 3) or maze provided in third gas flow channel 41 by baffle members 60. The circuitous gas flow path extends the contact period of air flowing in third gas flow channel 41 with the heat absorber member 40 and thus the air will become intensely hot.

The very hot air is discharged from the panel 10 at outflow passage 45 and is directed to a living space or a heat storage device.

Very hot air herein referred to is air having a temperature sufficient to make it practical to route the air to a heat storage device.

In the solar collector panel of the present invention, using the preferred single glazing, the amount of solar energy actually striking the absorber 40 (known as insolation) will be greater than for a panel having a conventional double-glazing. Although, if desired a double glazing may be employed, a single-glazing is preferred because it transmits more sunlight at more acute angles than a double-glazing. The translucent member 30 is inset from and not integral with the exterior single glazing 20. Reflection loss from the translucent member 30 is minimal because at the angles of incidence where reflection losses would be greatest, much of the sunlight reflected off the translucent member 30 will hit the interior sides of the panel and be picked up as heat by the flowing air. Re-radiation loss from the translucent member 30 is negligible because it is not in contact with the outdoor air.

A double-glazing (i.e. two glazings with a partially evacuated space therebetween) is used in the art in nearly all panel designs to reduce heat losses. In conventional panel designs, the air heated by the absorber is in contact with glazing losing heat through it to the outdoors. This may be readily understood by referring to the conventional solar collector panel 100 illustrated in FIG. 4 which comprises a double-glazing 101, an absorber 102, insulation 103, an air inflow 104, an air outflow 105, and an air channel 106.

In the solar collector panel in accordance with the present invention, relatively cool intake air is flowing in first channel 21 between the single glazing 20 and the translucent member 30. Heating of the flowing air by the absorber essentially begins in second channel 31 between the translucent member 30 and the absorber 40. The flowing air becomes very hot in the well insultated circuitous path of third channel 41. It will be readily appreciated that any heat flow toward the single glazing 20 and ultimately toward the outdoors will be substantially captured by the relatively cool intake air flowing in first channel 21 and thus be retained as useful heat by the flowing air. Accordingly, heat losses for the solar collector panel using a single glazing, in accordance with the present invention, are significantly lower than losses for a conventional very-hot-air panel usng a double-glazing with the heated air in contact with the double-glazing.

It will be appreciated that some or all the baffle members 60 may be fabricated from a high thermally conductive material such as aluminum which are thermally joined to the absorber member 40. However, this is not necessary to enjoy the benefits of the present invention and the baffle members 60 may be advantageously fabricated from materials such as thermoplastics, e.g., polyurethane.

It will be further appreciated that the solar collector panel, in accordance with the present invention, does not require a thick absorber whose surfce can be roughened as is conventional in existing very-hot-air panel designs to intensify the air-heating capacity. However, such absorber members may be employed, if desired.

It will be further appreciated that the side walls 13, 14 of the panel in the hot regions may be insulated, if desired.

The advantages of the solar collector panel in accordance with the present invention may be thus summarized as follows.

Less Heat Loss

Heat loss to outdoor air is minimized by the panel, in accordance with the present invention, since the air contacting the glazing is cool living-space air in the intake channel. The hottest air in the panel is in the well-insulated exit maze. The major reduction in glazing contact temperature leads to a significant lessening of heat loss, even with a single-glazing, compared with conventional very-hot-air designs, under all climate conditions except outdoor daytime temperatures consistently lower than about minus 10° F.

More Insolation

The panel, in accordance with the present invention, permits a single-glazing, with higher useable light transmission at more acute angles than a double-glazing. As hereinbefore explained, additional reflection and re-radiation losses caused by the translucent baffle member are small or at any rate rather less than for the second pane of a double-glazing assembly.

Longer Operating Day

The length of operation of a panel depends on the amount of insolation, the rate of heat loss, and the thermal characteristics of the absorber. Compared to conventional very-hot-air panels, the improved panel, in accordance with the present invention, will operate for a longer period of time on any given day, because the thinner absorber warms up more rapidly; insolation is higher throughout the day and is relatively much higher in the early morning or late afternoon; and heat loss is lower. All of these factors combine to enable the panel to attain operating temperatures earlier in the morning, maintain them later in the afternoon, and regain them more quickly after a cloudy or shadowed period.

More Useable Heat Yield

High insolation, less heat loss, longer operating day, and the baffled exit maze permit the improved panel, in accordance with the present invention, to deliver a high yield of useable BTUs in the course of a day, in the form of very hot air useful for storage purposes.

Low Cost

The improved panel, in accordance with the present invention, can be fabricated for about the same cost as low-temperature panels, which is to say significantly less than very-hot-air panels of conventional design. The additional parts needed for the improved panel are the exit maze (which can be of aluminum sheet or molded polyurethane) and the translucent baffle member (which can be glass or plastic), neither of which entail appreciable tooling or mounting cost. In return, the improved panel, in accordance with the present invention, saves in several respects: Single-glazing is very much cheaper than double-glazing, which must be partially evacuated and specially sealed. Overall panel sealing measures need not be designed to withstand very high temperatures, since the hottest air is the exit maze, isolated from the structural parts of the panel, and in particular not in contact with the exterior glazing and seal. A low-cost absorber can be used, which may be thin and painted rather than thick and electroplated. The structural framework can be lighter, since the panel need not support a heavy absorber plate or a perimeter casing for double-glazing, and need not withstand high temperatures.

An example of the fabrication of a solar panel in accordance with one embodiment of the present invention is as follows.

The following parts would be provided: one rear wall 55 of rigid plastic; one heat absorber sheet 40 of black-painted galvanized metal; one polyurethane block which has been molded to provide the baffling 60 for the circuitous gas flow exit maze 41 and also provides the panel insulation 46; one single glazing sheet 20 of clear plastic; one translucent sheet member 30, and four side members 11, 12, 13, 14 provided with ridges and grooves for receiving the other parts.

In assembling the panel, three of the side wall members are joined, e.g., with screws. The grooves for receiving the other parts are caulked. The rear wall, then the polyurethane block, then the heat absorber, then the translucent sheet, and then the glazing sheet are slid into their appropriate grooves. The fourth and last side member is caulked and affixed, e.g., by screws.

It will be apparent that due to the simplicity of assembly, the solar panel in accordance with the present invention can easily be shipped in knock-down form lowering the shipping costs and reducing the possibility of freight damage while in transport.

The present invention also includes an improved liquid thermal energy storage system particularly adaptable for use with the hereinbefore described very-hot-air solar collector panel in accordance with the present invention.

Figure 5:
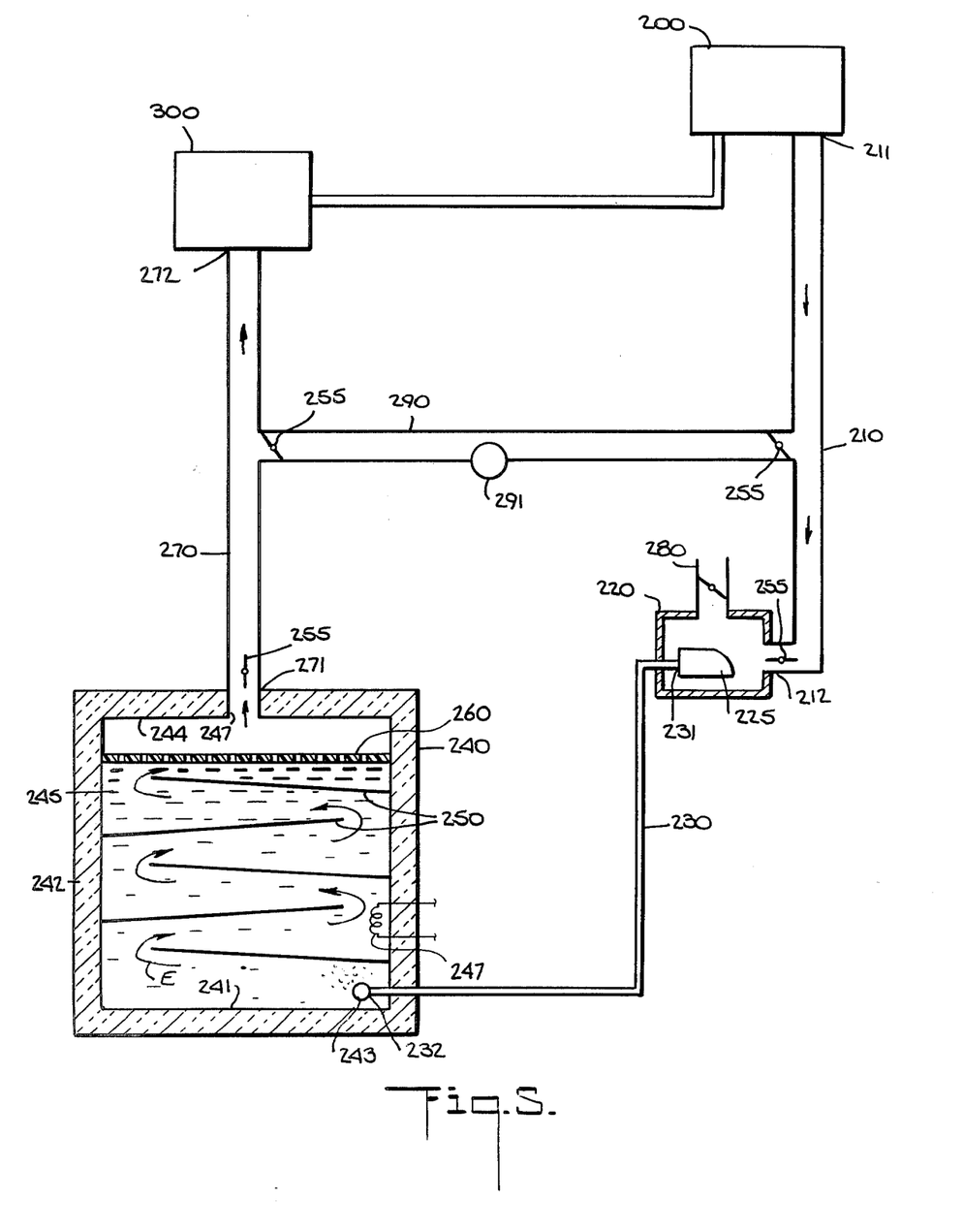
FIG. 5 is a schematic view partially in cross-section of a solar heating system in accordance with the present invention adaptable for use with the solar collector panel of FIG. 1.

Referring to FIG. 5, block 200 is a very-hot-air solar collector panel which may be the hereinbefore described solar collector panel in accordance with the present invention. Conduit 210, suitably ducting, has an intake end 211 joined to the hot air outlet of solar collector panel 200 and an outlet end 212 joined to pump chamber 220 for discharging hot air drawn from the panel 200 into pump chamber 220. The path of the hot air flow is indicated by the arrows in conduit 210.

Pump chamber 220 is suitably thermally insulated as indicated by 221. Pump chamber 220 has disposed therein a pump means 225 for drawing a suction in chamber 220.

A conduit 230 is joined at its intake end 231 to the discharge of pump means 225. Conduit 230 penetrates a side wall of liquid storage tank 240 near the tank bottom 241. Conduit 230 may suitably be a flexible insulated hose.

Tank 240, which is preferably a water tank, may be constructed of any suitable materials with a suitable liner if required. Advantageously, tank 240 is thermally insulated as indicated by 242. Tank 240 has disposed therein a heat retaining liquid 245, preferably water.

Tank 240 has disposed therein a plurality of baffle members 250. These baffle members may be mounted by one skilled in the art in any convenient manner. Advantageously, the baffle members 250 will be mounted with a small upward angle with respect to the horizontal as illustrated in FIG. 5. The baffle members 250 may be fabricated from any suitable material. Vinyl plastics may be employed to fabricate the baffle members 250 as well as the liner material for tank 240. Floating on the surface of the liquid 245 is a perforate slab of insulating material 260. Accordingly, the perforate slab 260 is fabricated from a material that is lighter than the liquid 245. Polyurethane perforate slabs may be employed with water. The perforate slab 260 is suitably of a size to substantially cover the surface of the liquid 245.

Located near the bottom 241 of tank 240 is a gas bubbling means 243 which is joined to the outlet end 232 of conduit 230. A perforated PVC tube may be used for the gas bubbling means.

At the top end 244 of tank 240 is a gas discharge 247. Conduit means 270 has an intake end 271 joined to tank 240 gas discharge and an outlet end 272 for discharging into a living space hot air heating system illustrated by block 300.

For a complete heating system, it would be advantageous to provide a conduit means 280 (partially illustrated) from the living space to be heated 300 to pump chamber 220 and a by-pass conduit means 290 from conduit 210 to conduit 270. Conduit means 290 would suitably include a blower fan 291.

For heat storage, the system, in accordance with the present invention, functions as follows. Hot air is drawn from the solar collector panel 200 via conduit 210 into pump chamber 220. Pump means 225 discharges the hot air via conduit 230 to gas bubbling means 243 near the bottom 241 of tank 240 thereby forming and discharging hot air bubbles near the bottom of the tank. The bubbles will rise in the water 245 stored in the tank making contact with the lowest tank baffle member 250, slide along it and then rise to the next lower baffle member 250. Accordingly, it will be appreciated that the air bubbles will follow a circuitous path through the water stored in the tank (generally illustrated by arrow E) giving off heat to the water as they travel through the tank. Because of the high surface-to-volume ratio of the individual bubbles, heat transfer from air to water should approach 100% efficiency. Furthermore, the bubbling action has a mixing effect which tends to keep the water at constant temperature throughout the tank. Air will finally escape through perforate insulation slab 260. The air, which has become humidified, escapes the tank and is vented to living space 300 via conduit 270.

An added efficiency feature of the system is that heat formed by the operation of pumping means 225 is captured by the air in pump chamber 220 and thus carried by the air to storage tank 240 as useable heat.

It will be understood by those skilled in the art that solar collector panel 200 may be a plurality of solar collector panels.

The system described herein would be routinely provided by one skilled in the art with dampers 255 (some illustrated) to selectively isolate or open the conduit means to gas flow as appropriate for the particular mode of operation of the system. Additional modes of operation will hereinafter be described. One skilled in the art could also routinely provide the system with thermostat devices, control means and electro-mechanical means to provide for the automated operation of system.

For releasing heat, the system in accordance with the present invention, functions as follows. The same air pump 225 draws living-space air via conduit means 280 and infuses bubbles into the water of storage tank 240 in similar fashion as when storing heat. The damper 255 of conduit 210 is closed and the damper 255 of conduit 280 would be opened. The air, being cooler than the previously solar-warmed water, gains heat from it. The warmed air emerges from the water, humidified, and is vented via conduit 270 to living space 300, propelled by the pump.

EXAMPLE

The following example of the operation of the system, in accordance with the present invention, for a hypothetical three days of operation, is set forth for illustrative purposes to further assist in the understanding of the invention. It should not, however, be construed as limiting the scope of the invention as set forth in the claims.

Day 1 begins with both the tank water 245 and the living space 300 at about 65° F. The sun shines, and the pump 225 starts to draw very hot air from the collectors 200, raising the water temperature. The air vented by conduit 270 in the morning is relatively cool, because the water temperature is still low, but at any rate it is warmer than 65° F. and humidified, and should be adequate to maintain a comfortable environment. Later in the afternoon the tank water 245 temperature has risen, so the air vented by conduit 270 is warmer, boosting the interior temperature for the late afternoon and early evening—exactly when most residential activities take place. During the night, the pump 225 operates intermittently under control of a thermostat in living space 300 in the hereinbefore described heat-release mode to maintain an interior living space 300 temperature of 55° F., not an uncomfortable level with good humidity.

Day 2 is relatively cloudy and the solar panels 200 operate infrequently, beginning to deplete heat storage in tank water 245. Sometime during the second night, tank water 245 temperature falls below 55° F. and is no longer capable of delivering heat to living space 300, so a back-up heating system comes on.

Day 3 is sunny, and begins with the living space at 65° F. (courtesy of back-up heating) but the water 245 is at 55° F. Hot air from the collectors 200 is alternated between storage in tank water 245 and direct delivery via the by-pass duct 290 duct, maintaining a living-space temperature of 65° F. while raising the water to the same temperature. Once the water attains 65° F. the by-pass duct 290 is no longer needed, so all the hot collector air is channeled through storage water 245.

It will be apparent that the system, in accordance with the present invention described herein, may be routinely modified and used for pre-water-heating or with a hot water space-heating system. For example, this could easily be accomplished by disposing a heat exchanger means 247 into the heat storage water 245 of tank 240 wherein the heat storage water would heat a second liquid (preferably water) in the heat exchangers for circulation. Alternately, the heat storage water 245 may itself be circulated for use.

The herein described solar heating system, in accordance with the present invention, makes it possible to match air-based solar collectors with water-tank storage, which is to say, to match a superior collector in accordance with the present invention with a superior form of storage such as water tanks. The resulting system has the following advantages.

High Efficiency of Solar Collection at a Low Cost of Collection

As hereinbefore described, the improved air-based panel, in accordance with the present invention, delivers more daily BTU's than conventional very-hot-air panels, which even at that are more efficient than liquid-based panels. The improved panel can be fabricated and installed for less than conventional very-hot-air panels, and very much less than liquid-based panels, which need plumbing, complicated absorber designs, flow-control mechanisms, and drain-back devices.

Compact, Low-Cost Storage

Water tanks, even when used with liquid-based panels, are inexpensive to fabricate and install. The present invention permits mechanical heat losses of the required pump to be recaptured and used.

Flexibility

Air-based panel/rock-bin systems can only be used with a warm-air heating system. Liquid-based panel/water-tank systems can only be used with hot-water heating. The solar heating system, in accordance with the present invention, can be readily interfaced with any of these.

Humidification

When used with a warm-air system, the system of the present invention provides humidified air whether storing heat or releasing it. No other solar system delivers humidified air by its intrinsic operation.

The solar heating system, in accordance with the present invention, constitutes a very effective, comparatively very low cost system of gathering solar energy and delivering it to the living space of a building in useful form and at useful times. The improved system greatly enhances the economic viability of solar energy for space heating and makes it acceptable for many uses which are at present marginal or impractical.

Figure 6:
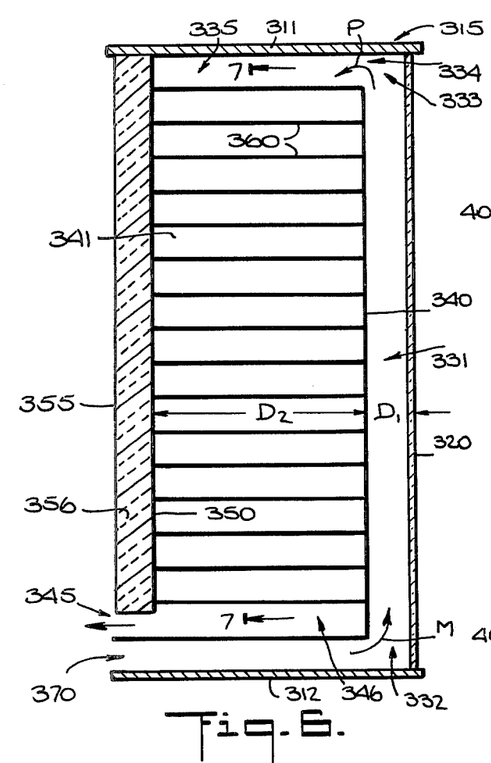
FIG. 6 is a schematic side elevation cross-sectional view of a solar collector panel in accordance with another embodiment of the present invention.

FIG. 6 shows an air-based solar collector panel 310 in accordance with another embodiment of the present invention comprising end walls 311 and 312 and side walls 313 and 314 (seen in FIG. 7) which form a panel frame 315. FIG. 6 illustrates the collector panel 310 in a vertical orientation with end wall 311 being at the top and end wall 312 being at the bottom. However, it will be readily understood by one skilled in the art that the collector panel 310 may assume a variety of orientations depending on the structure to which it is installed and the optimum orientation permitted by that structure to take best advantage of the sun's solar radiation.

A single glazing 320 is gas tightly mounted to frame 315 so as to form a front wall of the solar collector panel 310. It will be understood that a retractable or detachable protective wall member may be used to protect the glazing when the collector panel is not in use. The glazing 320 may be mounted to the frame 315 in any convenient manner known to the art.

A sheet-like radiant heat absorber member 340 is disposed within the frame 315 extending from side wall 313 to side wall 314 and spaced apart rearwardly from the glazing 320 so as to form a first gas flow channel 331 therebetween. Heat absorber member 340 is substantially coextensive with and preferably substantially paralled to glazing 320. The distance heat absorber member 340 spaced from glazing 320 in the embodiment illustrated in FIG. 6 is $D_1$.

A wall member 350 is disposed within the frame 315 extending from side wall 313 to side wall 314 and spaced apart rearwardly from the heat absorber member 340 so as to form a second gas flow channel 341 therebetween. Wall member 350 is substantially coextensive with and preferably substantially parallel to heat absorber member 340. The distance wall member 350 spaced from heat absorber member 340 in the embodiment illustrated in FIG. 6 is $D_2$.

A rear wall member 355 is mounted on frame 315 and is spaced apart rearwardly from wall member 350. Rear wall member 355 is substantially coextensive with and preferably parallel to wall member 350. Thermal insulation material 356 is disposed in the space between rear wall member 355 and wall member 350.

Figure 7:
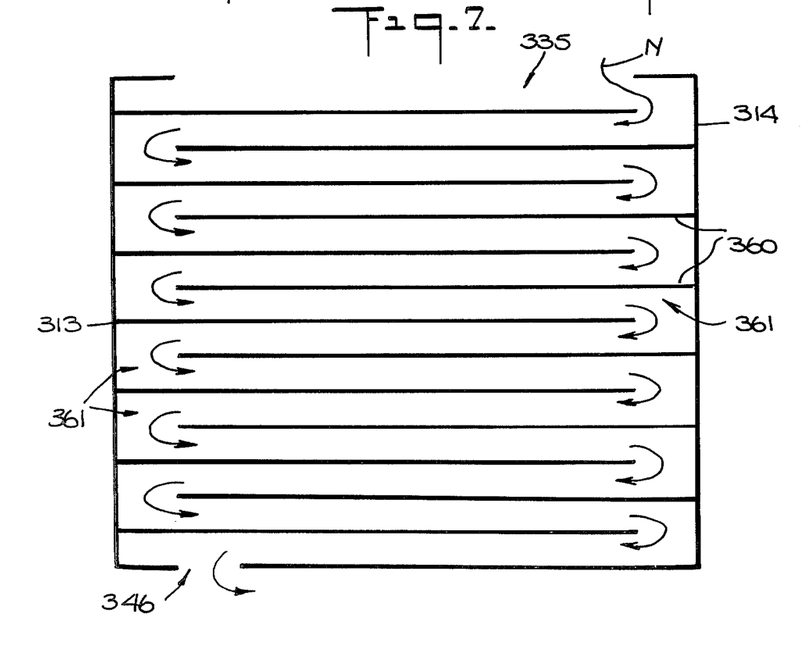
FIG. 7 is a schematic cross-sectional view of the solar collector panel of FIG. 6 along line 7—7.

A plurality of horizontal spaced apart baffle members 360 are disposed in second gas flow channel 341 extending from wall member 350 to heat absorber member 340 as illustrated in FIG. 6. Preferably, the baffle members 360 are substantially normal to heat absorber member 340 and wall member 350. As illustrated in FIG. 7, alternate baffle members extend from side wall 313 stopping short of side wall 314 and extend from side wall 314 stopping short of side wall 313. Accordingly, gas flow passages 361 are formed between the spaces defined by adjacent baffle members 360 with the passages 361 for adjacent baffle members 360 alternating from being near side wall 313 and side wall 314. It will be appreciated that baffle members 360 have provided a circuitous gas flow path or gas flow maze as indicated by arrow N (FIG. 7) in second gas flow channel 341 the reasons for which were hereinbefore discussed in connection with the embodiment of the invention illustrated in FIGS. 1 through 3. It will become apparent that other arrangements of the baffle members 360 may be provided.

A gas inflow passage 370 in panel 310 is provided near end wall 312 for introducing air from the exterior which is discharged into inlet 332 of first gas flow channel 331 which is also located near end wall 312. A gas flow passage 334 is provided between first gas flow channel 331 outlet 333 and second gas flow channel 341 inlet 335 near end wall 311. Gas flow passage 334 may be conveniently provided by terminating heat absorber member 340 near but not touching end wall 311.

A gas outflow passage 345 is provided at second gas flow channel 341 outlet 346 adjacent gas inflow passage 370 near end wall 312 for the outflow of gas from the panel 310 to the exterior. It will be apparent that the locations of the gas inflow and outflow passages may be readily modified.

The glazing 320 is a non-air-permeable material such as clear glass or clear plastic or any other material which will readily transmit solar radiation to the heat absorber member 340. A single glazing is preferred. However, double glazings or other glazing arrangements may be used in the solar panel in accordance with this embodiment of the present invention.

The heat absorber member 340 is preferably a flat, thin sheet of material which has been blackened, e.g. by paint, on its side facing the glazing 320 to increase its heat radiation absorption capability. Thicknesses of the sheet-like heat absorber member may be, e.g., 20-24 gauge. The heat absorber member may be advantageously fabricated from high thermally conductive material such as aluminum or copper or steel. Other materials may be used.

In the embodiment of the present invention illustrated in FIG. 6, the volume $V_2$ of the second gas flow channel 341 is very much greater than the volume $V_1$ of the first gas flow channel 331. This may be accomplished by constructing panel 310 such that the spacing $D_2$ of wall member 350 from heat absorber member 340 is very much greater than the spacing $D_1$ of heat absorber member 340 from the glazing 320. It will be appreciated that the dimensions of first gas flow channel 331 and second gas flow channel 341 between end walls 311 and 312 may be considered as substantially equal and between side walls 313 and 314 may be considered as substantially equal.

That is, in accordance with the present invention, for a selected rate of air flow through a given panel, the volume of the second air flow channel is advantageously adjusted to be maximized with respect to the volume of the first air flow channel.

Advantageous ranges of the volume $V_2$ of second gas flow channel 341 with respect to the volume $V_1$ of the first gas flow channel may be such that $V_2:V_1$ is about 5:1 to 12:1. Accordingly $D_2:D_1$ may be considered about 5:1 to 12:1 in the embodiment illustrated in FIG. 6.

The advantages of the solar collector panel in accordance with this embodiment of the present invention will become apparent.

In operation, the solar collector panel of the embodiment of the present invention illustrated in FIG. 6 functions as follows. Sunlight is transmitted through the glazing 320 and strikes the absorber member 340 heating the absorber member.

Air is drawn, for example from a living space, by a pump or blower fan (not shown) and inputted into air inflow passage 370 and enters first gas flow channel 331 (as illustrated by arrow M in FIG. 6) which may be referred to as an air intake channel. The air flows in first gas flow channel 331 and enters second gas flow channel 341 (as illustrated by arrow P in FIG. 6) and flows through the circuitous gas flow path (as illustrated by arrow N in FIG. 7) or maze provided in the second gas flow channel 341 by baffle members 360. The circuitous gas flow path provides for an extended contact period for the air flowing in this circuitous path with the heat absorber member 340 and thus the air will become intensely hot.

The very hot air is discharged from the panel 310 at outflow passage 345 to a living space or a heat storage device.

It will be appreciated that the air flowing in the first gas flow or air intake channel 331 will flow through this channel relatively rapidly due to the fact that the channel is narrow or stated otherwise has a relatively small volume $V_1$. It will thus be appreciated that the air flowing in first gas flow channel will not be appreciably heated and is relatively cool in comparison to the air being heated in the circuitous gas flow path.

Accordingly, the embodiment of the invention illustrated in FIG. 6 permits the hereinbefore discussed advantageous use of a single glazing since heat flow toward the single glazing and ultimately toward the outdoors will be substantially captured by the relatively cool air flowing in first gas flow channel 331 and thus be retained as useful heat by the flowing air.

Although, a single glazing is preferred because of cost advantages and structual simplicity, a double glazing may be used, if desired, and the advantage of reduced heat loss in comparison with prior art double-glazing very-hot-air panels will be accrued.

The embodiment of the present invention illustrated in FIG. 6 also permits the use of a relatively thin, light weight heat absorber member in comparison to heat absorber members in conventional very-hot-air solar collector panels because of the use of the circuitous gas flow path provided for heating of the air.

However, second gas flow channel 341 need not provide a circuitous gas flow path (i.e. baffle member 360 may be omitted) and significant advantages of the invention will still be obtained.

If baffle members 360 are omitted, second gas flow channel 341 will still have a very much greater volume $V_2$ than the volume $V_1$ of first gas flow channel 331. Air will flow through second gas flow channel 341 relatively much slower than air will flow through first gas flow channel 331. Thus, the air flowing in second gas flow channel 341 will have the opportunity to become very intensely heated. The relatively rapid flowing air in first gas flow channel 331 will still intercept outflowing heat and permit the advantageous use of a single glazing or reduce heat loss if a double glazing is employed. If a circuitous gas flow path is not provided in the second gas flow channel 341, a thicker, roughened heat absorber member would be desirable.

A circuitous gas flow path is preferred for second gas flow channel 341 because it provides for superior heating of the flowing air and permits the efficient use of a thin light weight heat absorber member.

It will be appreciated that the efficiency of the embodiment of the present invention will depend on the degree to which the glazing contact temperature can be minimized which is a function of the ratio between the respective volumes of the second gas flow channel 341 and the first gas flow channel 331, for any given desired delivery air temperature.

Figure 8:
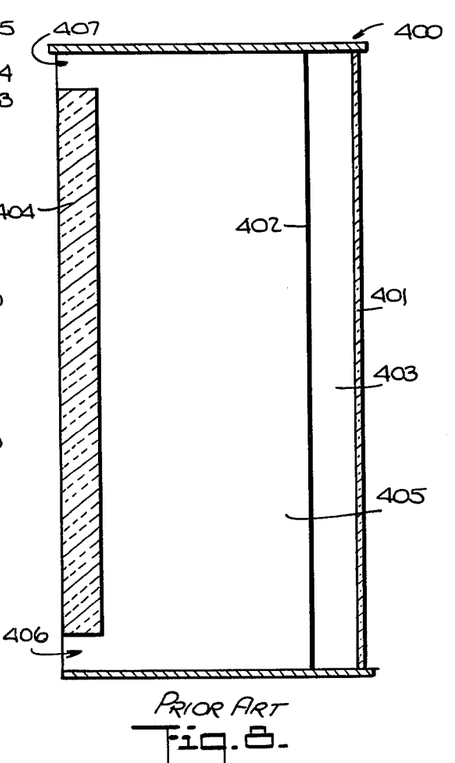
FIG. 8 is a schematic side elevation cross-sectional view of another prior art very hot air solar collector panel.

The advantages of the embodiment of the present invention illustrated in FIG. 6, may be further appreciated by considering a prior art solar collector panel illustrated in FIG. 8.

The prior art solar collector panel 400 illustrated in FIG. 8 comprises a single glazing 401, a heat absorber member 402 which is spaced a short distance from the single glazing 401 forming an air space 403 therebetween. The arrangement of single glazing 401 and the heat absorber member 402 is such that there is no significant air flow in air space 403. Thus the air in air space 403 is essentially stagnant air.

Panel 400 further comprises a thermally insulating rear wall member 404 spaced a large distance from heat absorber member 402 to provide a relatively very large volume air flow channel 405 in comparison to the volume of air space 403. Air inflow 406 and air outflow 407 are also provided.

It will be apparent that relatively cool air will enter air inflow 406, be heated by the heat absorber member 403 as it flows through air flow channel 405 and be discharged through air outflow 407 to a living space or storage.

Air in air space 403 will also become very hot and large amounts of heat will be lost through the single glazing to the outdoors.

In contrast, the embodiment of the present invention illustrated in FIG. 6 provides for the relatively rapid flow of relatively cool air in the relatively narrow air space 331 between the single glazing 320 and heat absorber member 340 which captures significant amounts of heat which would tend to flow from the heat absorber member 340 toward the outdoors through glazing 320 and retains it as useful heat energy. It will be apparent that the present invention will be advantageous even if the prior art solar collector panel illustrated in FIG. 8 is provided with a double-glazing.

Solar collector panels in accordance with the present invention are conveniently fabricated having a maximum thickness of about 8 to 12 inches. This dimension is given by way of example as thicker panels tend to increase costs, heat losses increase through the sides of the panel, and handling becomes more difficult. The fabrication considerations and techniques described in conjunction with the embodiment of the present invention of FIG. 1 are also generally applicable to the embodiment of the present invention of FIG. 6.

The embodiment of the present invention illustrated in FIG. 6 provides a low cost alternative to the embodiment of the present invention illustrated in FIG. 1 while still retaining significant advantages with respect to prior art solar collector panels. The embodiment of the present invention illustrated in FIG. 6 eliminates the need for the translucent member 30 of the embodiment of the invention desribed in connection with FIG. 1. This represents a substantial cost saving in the fabrication of the panel with a small sacrifice of thermal efficiency.

The embodiment of the present invention illustrated in FIG. 6 also provides for higher insolation at acute angles than the embodiment of FIG. 1 which makes it an attractive alternative for use in locations where a panel cannot be oriented substantially to the south (e.g. a southwest facing wall).

Both the embodiments of the solar collector panel in accordance with the present invention result in increased net heat yield and reduced heat loss in comparison with prior art very-hot-air solar collector panels. Both embodiments of the present invention permit the thermally effecient use of a single glazing in a very-hot-air- solar collector panel which results in substantial cost savings in panel fabrication. For example, in a conventional $4 \times 8$ double-glazed panel with tempered glass, the double-glazing costs approximately $250.00 (1982 United States dollars) which constitutes a major portion of the retail price of the panel.

It will be readily apparent that the solar collector panel of the embodiment of the present invention illustrated in FIG. 6 may be advantageously used in conjunction with the liquid thermal energy storage system of the present invention described herein. Accordingly, the solar collector panel 310 in accordance with the present invention may be used as the solar collector panel 200 of FIG. 5.

EXAMPLE

In order to permit further appreciation and understanding of the solar collector panels in accordance with the present invention, the following example of the estimated performance of the solar collector panels of the invention in comparison with prior art very-hot-air solar collector panels is set forth. This example should not, however, be construed as limiting the scope of the invention as set forth in the claims.

Table I sets forth estimated values for insolation, glazing contact temperature, and heat loss and net heat yield at the temperatures indicated for the solar collector panels in accordance with the present invention and very-hot-air solar collector panels of the prior art.

Column A of Table I represents the solar collector panel of the present invention illustrated in FIG. 1.

Column B of Table I represents the solar collector panel of the invention illustrated in FIG. 6.

Figure 4:
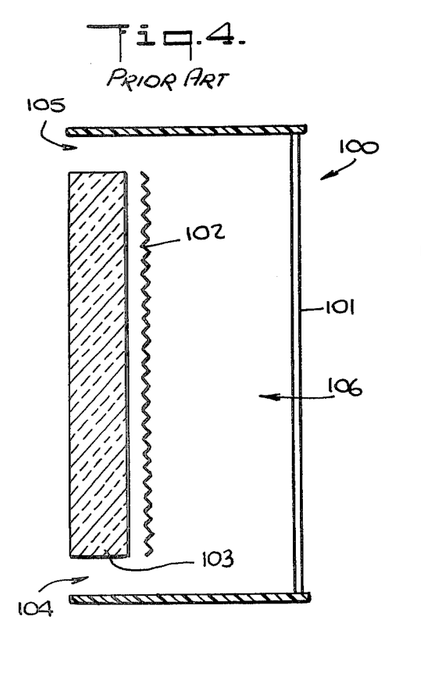
FIG. 4 is a schematic side elevation cross-sectional view of a prior art very-hot-air solar collector panel.

Column C of Table I represents the prior art solar collector panel having a double-glazing illustrated in FIG. 4.

Column D of Table I represents the prior art solar collector panel having a single glazing illustrated in FIG. 8.

The following assumptions were made in estimating the values of Table I.

The panels are facing dead south on a sunny day in mid-winter at a latitude of 40° N (e.g. New York City). Gross insolation is taken to be 1360 BTU/square foot/day. A net insolation of 85% of gross insolation is taken for the single glazing of the panels of column B (present invention) and column D (prior art). A net insolation of 80% of gross insolation is taken for the single glazing plus translucent member of the panel of column A (present invention). A net insolation of 75% of gross insolation is taken for the double-glazing of the panel of column C (prior art). The U-factor of the single glazing is taken as 1.15. The U-factor of the double-glazing is taken as 0.65. U-factor is the arithmetic inverse of the R value. Internal air temperature—105° F.

Variations in the length of the operating day have been ignored. Such variations will favor the invention. The operating day has been taken as six hours for all panels. Variations in the heat absorptive quality of the heat absorber member have been ignored. The heat absorptive quality of the absorber has been assumed the same for all panels. The units of the values set forth in Table I are as follows:

Net insolation—BTU/6-hour operating day/square foot of glazing.

Contact temperature—average temperature of air touching the exterior glazing in degree F.

U-factor—BTU/square foot hour/degree F. of temperature difference (heat loss rate).

Heat loss—BTU/square foot/day [i.e., (contact air temperature—exterior temperature)].

Net heat yield—Net insolation minus heat loss.

TABLE I

|  | A Present Invention | B Present Invention | C Prior Art | D Prior Art |
|---|---|---|---|---|
| Net Insolation | 1,090 | 1,155 | 1,020 | 1,155 |
| Contact Temperature | 65 | 80 | 100 | 100 |
| U-Factor | 1.15 | 1.15 | 0.65 | 1.15 |
| Exterior Air 50° F. | | | | |
| Heat Loss | 105 | 205 | 195 | 345 |
| Net Heat Yield | 985 | 950 | 825 | 810 |
| Exterior Air 40° F. | | | | |
| Heat Loss | 175 | 275 | 235 | 415 |
| Net Heat Yield | 915 | 880 | 785 | 740 |
| Exterior Air 30° F. | | | | |
| Heat Loss | 240 | 345 | 275 | 485 |
| Net Heat Yield | 850 | 810 | 745 | 670 |
| Exterior Air 20° F. | | | | |
| Heat Loss | 310 | 414 | 310 | 550 |
| Net Heat Yield | 780 | 740 | 710 | 605 |
| Exterior Air 10° F. | | | | |
| Heat Loss | 380 | 485 | 350 | 620 |
| Net Heat Yield | 710 | 670 | 670 | 534 |
| Exterior Air 0° F. | | | | |
| Heat Loss | 450 | 550 | 390 | 690 |
| Net Heat Yield | 640 | 605 | 630 | 465 |

Although preferred embodiments of the present invention have been described in detail, it is contemplated that modifications may be made within the spirit and scope of the invention.

What is claimed is:

1. A solar collector panel comprising a frame member having two spaced apart end walls and two spaced apart side walls;

a glazing supported by said frame member and forming a front wall for exposure to solar radiation;

a translucent member disposed in said frame member spaced rearwardly from said glazing wherein said translucent member is substantially coextensive with said glazing for providing a first gas flow channel therebetween having an inlet and an outlet;

a radiant heat absorber member disposed in said frame member spaced rearwardly from said translucent member wherein said heat absorber member is substantially coextensive with said translucent member for providing a second gas flow channel 1 therebetween having an inlet and an outlet;

a wall member disposed in said frame member rearwardly from said heat absorber member wherein said wall member is substantially coextensive with said heat absorber member for providing a third gas flow channel therebetween having an inlet and an outlet;

a plurality of baffle members disposed within said third gas flow channel for providing a circuitous gas flow path in said third gas flow channel for extending the contact between said heat absorber member and a gas flowing in said third gas flow channel;

a first gas flow passage between said first channel outlet and said second channel inlet for providing gas flow communication therebetween;

a second gas flow passage between said second channel outlet and said third channel inlet for providing gas flow communication therebetween;

means for providing gas flow communication from the exterior of said panel into said first channel inlet;

means for providing gas flow communication from said third channel outlet to a first conduit means having an end terminating in a tank for holding a heat storage liquid, said tank comprising:

a top end and a bottom end;

a gas bubbling means located near said bottom end of said tank joined in gas flow communication with said conduit means termination end;

a plurality of baffle members disposed in said tank for providing a circuitous path of travel from near said tank bottom to said tank top for gas bubbles discharged from said bubbling means into said liquid disposed in said tank for extending the contact between said gas bubbles and said liquid;

a perforate slab of thermal insulation material disposed in said tank for positioning adjacent to the surface of said liquid disposed therein, said slab having a size sufficient to substantially cover said liquid surface; and gas discharge means located at the top end of said tank.

2. An apparatus as recited in claim 1 wherein said perforate slab of thermal insulation material is constructed from material lighter than said liquid for floating on said surface of said liquid.

3. An apparatus as recited in claim 2 wherein said tank is substantially surrounded by thermal insulation material.

4. An apparatus as recited in claim 3 wherein said first conduit means comprises:

a second conduit means having a first end joined in gas flow communication to said third channel outlet gas flow communication means and a second end joined in gas flow communication with a chamber;

a pump means disposed in said chamber for drawing gas into said chamber and discharging gas therefrom; and a third conduit means having a first end joined in gas flow communication with said pump means discharge and a second end joined in gas flow communication with said gas bubbling means.

5. An apparatus as recited in claim 4 further comprising a fourth conduit means for providing gas flow communication from said tank gas discharge means to a space to be heated.

6. An apparatus as recited in claim 5 further comprising a fifth conduit means for selectively providing gas flow communication from said space to said chamber.

7. An apparatus as recited in claim 6 further comprising a sixth conduit means for selectively providing gas flow communication from said third channel outlet gas flow communication means to said space wherein said sixth conduit means includes a blower means.

8. An apparatus as recited in claim 1 further comprising heat exchanger means disposed in said tank for transferring heat between said tank heat storage liquid and a second liquid circulating in said heat exchanger means.

9. An apparatus as recited in claim 1 wherein said heat storage liquid is water.

10. An apparatus as recited in claim 8 wherein said second liquid is water.

11. A solar heating system comprising:
(A) an air-based solar collector panel having means for discharging heated air;
(B) a tank for holding water wherein said tank comprises
  (i) a top end and a bottom end;
  (ii) gas bubbling means located near said bottom end of said tank;
  (iii) a plurality of baffle members disposed in said tank for providing a circuitous path of travel from near said tank bottom to said tank top for air bubbles discharged from said bubbling means into said water for extending the contact between said air bubbles and said water;
  (iv) a perforate slab of thermal insulation material constructed from a material lighter than water disposed in said tank for floating on the surface of said water and wherein said slab has a size sufficient to substantially cover said water surface;
  (v) gas discharge means located at the top end of said tank; and
  (vi) thermal insulation material substantially surrounding said tank;
(C) first conduit means for providing gas flow communication between said panel discharge means and said bubbling means; and
second conduit means for providing gas flow communication between said tank gas discharge means and a space to be heated.

12. A system as recited in claim 11 wherein said first conduit means includes a chamber having a pumping means disposed therein for drawing air into said chamber and discharging said drawn in air to said bubbling means.

13. A system as recited in claim 12 wherein said chamber is thermally insulated.

14. A system as recited in claim 13 which further comprises a third conduit means for selectively providing gas flow communication from said space to said chamber.

15. A system as recited in claim 14 which further comprises a fourth conduit means for selectively providing gas flow communication from said collector panel discharge means to said space wherein said fourth conduit means includes a blower means.

16. A solar collector panel as recited in claim 44 wherein said wall member, said baffle members and said thermal insulation is provided by a polyurethane molded block.

17. A solar collector panel as recited in claim 1 or 2 wherein,
said first gas flow channel inlet is near one end wall and said first gas flow channel outlet is near the other end wall;
said second gas flow channel inlet is near said other end wall and said second gas flow channel outlet is near said one end wall; and
said third gas flow channel inlet is near said one end wall and said third gas flow channel outlet is near said other end wall.

18. A solar collector panel comprising a frame member having two spaced apart end walls and two spaced apart side walls;
a single glazing supported by said frame member and forming a front wall for exposure to solar radiation;
a radiant heat absorber member disposed in said frame member and spaced rearwardly from said glazing wherein said heat absorber member is substantially coextensive with said glazing for providing a first gas flow channel therebetween having an inlet and an outlet; wherein,
said first gas flow channel has a first volume $V_1$;
a wall member disposed in said frame member rearwardly from said heat absorber member wherein said wall member is substantially coextensive with said heat absorber member for providing a second gas flow channel therebetween having an inlet and an outlet; wherein,
said second gas flow channel has a second volume $V_2$ such that $V_2$ is at least 5 times greater than $V_1$ and wherein said single glazing, said radiant heat absorber member and said wall member are substantially planar and oriented substantially parallel to one another;
a first gas flow passage between said first channel outlet and said second channel inlet for providing gas flow communication therebetween;
means for providing gas flow communication from the exterior of said panel into said first channel inlet;
means for providing gas flow communication from said second channel outlet to a first conduit means having an end terminating in a tank for holding a heat storage liquid, said tank comprising:
a top end and a bottom end;
gas bubbling means located near said bottom end of said tank joined in gas flow communication with said conduit means termination end;
a plurality of baffle members disposed in said tank for providing a circuitous path of travel from near said tank bottom to said tank top for gas bubbles discharged from said bubbling means into said liquid disposed in said tank for extending the contact between said gas bubbles and said liquid;
a perforated slab of thermal insulation material disposed in said tank for positioning adjacent to the surface of said liquid disposed therein, said slab having a size sufficient to substantially cover said liquid surface; and a gas discharge means located at the top end of said tank.

19. An apparatus as recited in claim 18 wherein said perforate slab of thermal insulation material is constructed from material lighter than said liquid for floating on said surface of said liquid.

20. An apparatus as recited in claim 18 wherein said tak is substantially surrounded by thermal insulation material.

21. An apparatus as recited in claim 20 wherein said first conduit means comprises:
- a second conduit means having a first end joined in gas flow communication to said second channel outlet gas flow communication means and a second end joined in gas flow communication with a chamber;
- a pump means disposed in said chamber for drawing gas into said chamber and discharging gas therefrom; and
- a third conduit means having a first end joined in gas flow communication with said pump means discharge and a second end joined in gas flow communication with said gas bubbling means.

22. An apparatus as recited in claim 21 further comprising a fourth conduit means for providing gas flow communication from said tank gas discharge means to a space to be heated.

23. An apparatus as recited in claim 22 further comprising a fifth conduit means for selectively providing gas flow communication from said space to said chamber.

24. An apparatus as recited in claim 23 further comprising a sixth conduit means for selectively providing gas flow communication from said second channel outlet gas flow communication means to said space wherein said sixth conduit means includes a blower means.

25. An apparatus as recited in claim 18 further comprising heat exchanger means disposed in said tank for transferring heat between said tank heat storage liquid and a second liquid circulating in said heat exchanger means.

* * * * *

UNITED STATES PATENT AND TRADEMARK OFFICE
CERTIFICATE OF CORRECTION

PATENT NO. : 4,484,566
DATED : November 27, 1984
INVENTOR(S) : Emmanuel Gonzalez It is certified that error appears in the above-identified patent and that said Letters Patent is hereby corrected as shown below:

In Claim 16, line 1, delete "44" and insert --1--.

Signed and Sealed this

Ninth Day of July 1985

[SEAL]

Attest:

DONALD J. QUIGG

*Attesting Officer*     *Acting Commissioner of Patents and Trademarks*